United States Patent [19]

Ichimura et al.

[11] Patent Number: 5,629,782
[45] Date of Patent: May 13, 1997

[54] HOLOGRAPHIC DISPLAY APPARATUS

[75] Inventors: Kouichi Ichimura, Yokohama; Masayuki Nakamoto, Chigasaki, both of Japan

[73] Assignee: Kabushiki Kaisha Toshiba, Kawasaki, Japan

[21] Appl. No.: 526,095

[22] Filed: Sep. 11, 1995

[30]  Foreign Application Priority Data

Sep. 16, 1994  [JP]  Japan .................... 6-222191

[51] Int. Cl.[6] ............................................. G03H 1/08
[52] U.S. Cl. ............................. 359/9; 359/4; 359/32
[58] Field of Search ................................ 359/4, 9, 22, 23, 359/32, 35, 318; 345/84

[56]  References Cited

U.S. PATENT DOCUMENTS

| | | | |
|---|---|---|---|
| 5,296,948 | 3/1994 | Chen et al. | 359/1 |
| 5,489,933 | 2/1996 | Betsui et al. | 347/120 |
| 5,491,375 | 2/1996 | Iwasaki | 313/409 |

OTHER PUBLICATIONS

Proceedings of the 12th International Display Research Conference, "Moving 3D-CGH Reconstruction Using a Liquid Crystal Spatial Wavefront Modulator", Sonehara, et al; Oct. 12–14, 1992, pp. 315–318.

*Primary Examiner*—Paul M. Dzierzynski
*Assistant Examiner*—Darren E. Schuberg
*Attorney, Agent, or Firm*—Oblon, Spivak, McClelland, Maier & Neustadt, P.C.

[57]  ABSTRACT

A holographic display apparatus has a display section including a back plate, on which a cold cathode device of the field emission type having a great number of fine emitter electrodes is arranged. The display section includes a transparent and conductive front plate, on which a great number of anode electrodes, which define pixels, are arranged respectively opposite the emitter electrodes. The emitter electrodes are selected so as to emit electrons by an input signal prepared in accordance with the interference pattern of a holographic diffraction figure. The anode electrodes are excited and induced by electron rays from the emitter electrodes to change their reflection coefficient. The interference pattern is displayed on the basis of the change in the reflection coefficient of the anode electrodes.

20 Claims, 3 Drawing Sheets

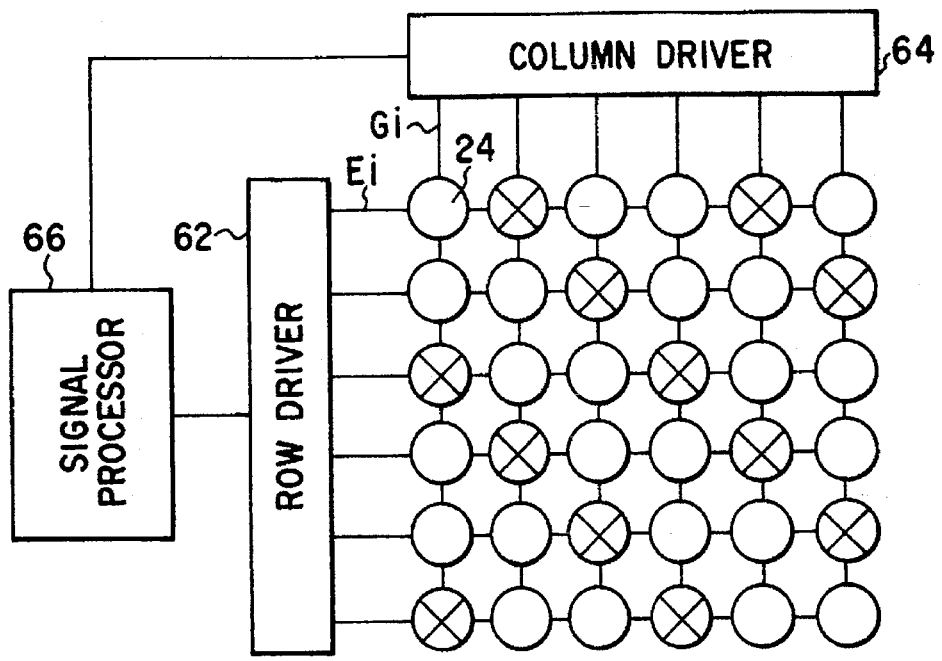
F I G. 4
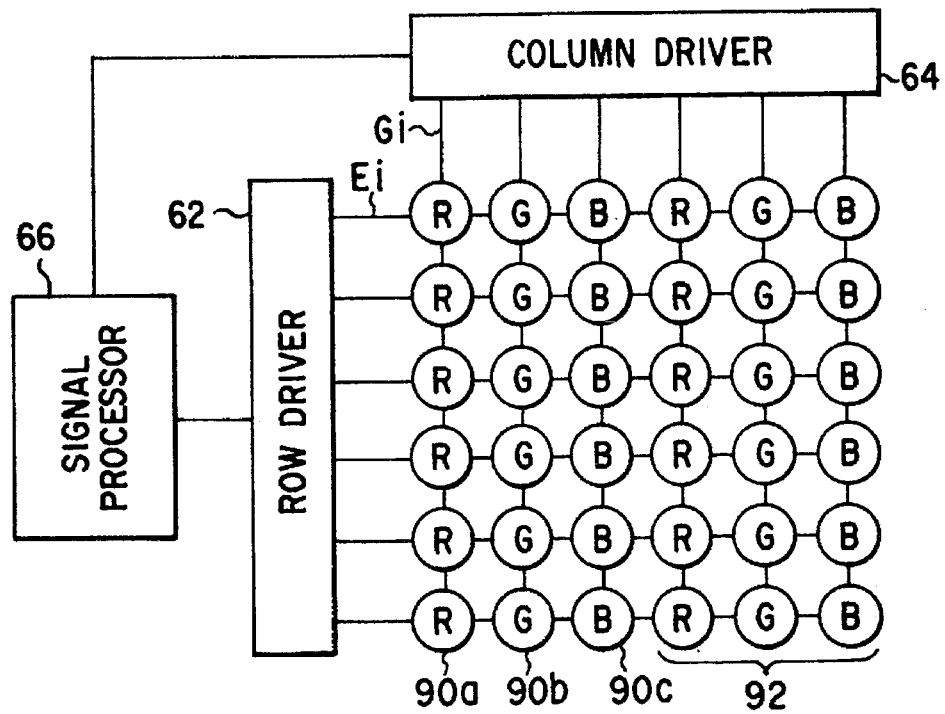
F I G. 5

HOLOGRAPHIC DISPLAY APPARATUS

BACKGROUND OF THE INVENTION

1. Field of the Invention

The present invention relates to a holographic display apparatus.

2. Description of the Related Art

A holographic display apparatus, which can refigure images or display moving images, has been researched to realize it, but has not yet been established. In order to reproduce a stereoscopic image within the visible region, it is necessary to display an interference pattern with a resolution corresponding to a spatial frequency of from 1000 /mm to 3000 /mm. Therefore, where an interference pattern of hologram is recorded and displayed with a photosensitive material, such as a photographic film or photographic dry plate, silver halide having a particle diameter of from 50 nm to 60 nm is used to increase the resolution of the pattern.

A method of displaying an interference pattern has been proposed, which utilizes a liquid crystal display device of the reflection type. A display device using liquid crystal has a pixel size as large as 10 μm at least ("TV PICTURE OPTICS HANDBOOK", edited by TV Association, Ohm-Shya, 1980). Due to this, it is difficult to obtain a resolution sufficient to display an interference pattern necessary for reproducing a stereoscopic image within the visible region.

As described above, a fine pixel size has not yet been realized, which provides a display section with a sufficient resolution, in conventional tests to form a holographic display apparatus.

SUMMARY OF THE INVENTION

The present invention has been made to solve the above described problems and has an object of providing a holographic display apparatus having a resolution sufficient to display an interference pattern necessary for reproducing a stereoscopic image within the visible region.

According to a first aspect of the present invention, there is provided a holographic display apparatus for displaying an interference pattern of a holographic diffraction figure which is irradiated with a reproduction light to reproduce a stereoscopic image, comprising:

a plurality of anode electrodes arranged such that each of a plurality of pixels arranged in a matrix is defined by at least one of the anode electrodes, the anode electrodes being excited and induced to change their reflection coefficient when irradiated with electrons;

a plurality of emitter electrodes arranged opposite the anode electrodes, the emitter electrodes selectively emitting electrons to the anode electrodes by field emission;

a casing for defining an air-tight vacuum space containing the anode and emitter electrodes; and a drive mechanism for selecting some of the emitter electrodes and causing them to emit electrons, in accordance with an input signal representing an interference pattern to be displayed by the pixels;

wherein an interference pattern is displayed on the basis of a change in the reflection coefficient of the anode electrodes due to radiation of electrons emitted from the emitter electrodes.

According to a second aspect of the present invention, there is provided a holographic display apparatus for displaying an interference patter of a holographic diffraction figure which is irradiated with a reproduction light to reproduce a colored stereoscopic image, comprising:

a plurality of anode electrodes arranged such that each of a plurality of pixels arranged in a matrix is defined by at least one of the anode electrodes, the anode electrodes being excited and induced to change their reflection coefficient when irradiated with electrons, the pixels forming a plurality of pixel sets comprising three adjacent pixels for displaying red, green and blue, the anode electrodes, used for displaying red, green and blue, being prepared to have changes in their reflection coefficient, respectively, when irradiated with electrons, near wavelengths of the reproduction light, corresponding to red, green and blue;

a plurality of emitter electrodes arranged opposite the anode electrodes, the emitter electrodes selectively emitting electrons to the anode electrodes by field emission;

a casing for defining an air-tight vacuum space containing the anode and emitter electrodes; and a drive mechanism for selecting some of the emitter electrodes and causing them to emit electrons, in accordance with an input signal representing an interference pattern to be displayed by the pixels;

wherein an interference pattern is displayed on the basis of a change in the reflection coefficient of the anode electrodes due to radiation of electrons emitted from the emitter electrodes.

In a holographic display apparatus according to the present invention, when electrons or electron rays emitted from the emitter electrodes strike the anode electrodes, which are made of a material to be induced to change its reflection coefficient by radiated electrons, the struck portions change their reflection coefficient. Where the electrons are radiated from the back sides of the anode electrodes, the anode electrodes have a thickness such that their front sides change the reflection coefficient by electron radiation. A display face is formed by arranging the pixels in a matrix in the second dimension, each of the pixels comprising one pair or a plurality of pairs of emitter and anode electrodes. An interference pattern is displayed on the display face as a figure drawn with pixels which have changed the reflection coefficient.

Since the pixels of the present invention are formed, using fine cold cathodes of the field emission type, it is possible to make the size of each pixel as small as 100 nm×100 nm or less, thereby obtaining a resolution sufficient to display a holographic interference pattern within the visible region. When the reproduction light is radiated on an interference pattern displayed in accordance with an input signal, a holographic diffraction figure, which can be recognized as a stereoscopic image by an observer, is formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing the arrangement of pixels in the display section of the holographic display apparatus according to the embodiment; and FIG. 5 is a view showing the arrangement of pixels in the display section of a holographic display apparatus according to another embodiment of the present invention.

DETAILED DESCRIPTION OF THE PREFERRED EMBODIMENTS

Figure 1:
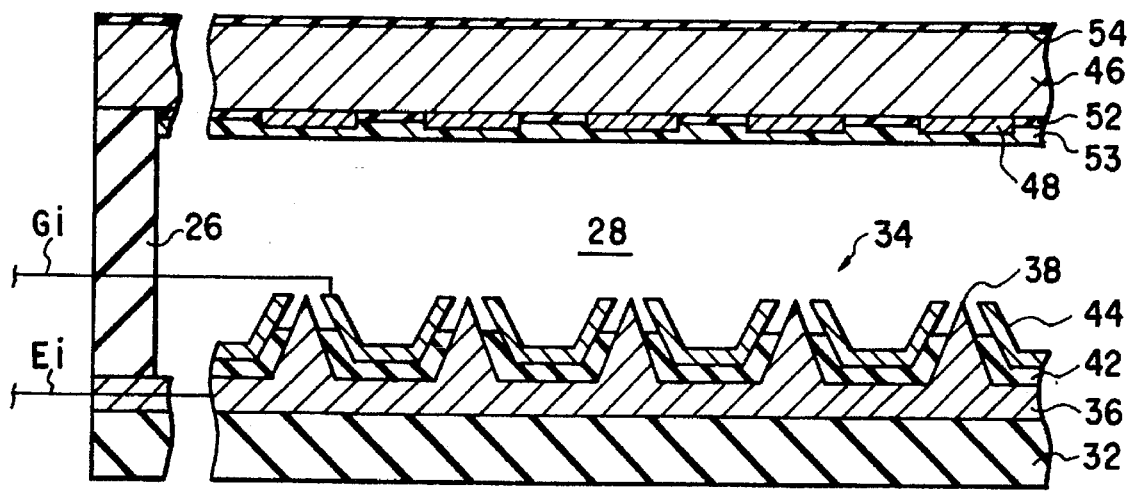
FIG. 1 is a cross-sectional view schematically showing part of a holographic display apparatus according to an embodiment of the present invention.
Figure 2:
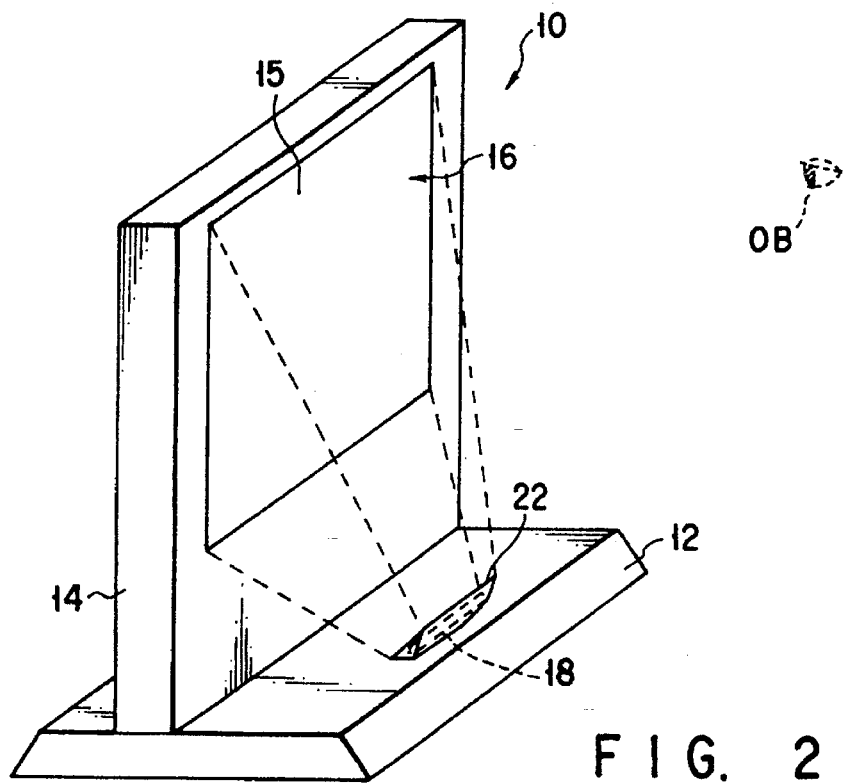
FIG. 2 is a perspective view schematically showing the entirety of the holographic display apparatus according to the embodiment.

FIG. 2 is a perspective view schematically showing the entirety of a holographic display apparatus 10 according to an embodiment, while FIG. 1 is a cross-sectional view schematically showing its display section 16.

As shown in FIGS. 1 and 2, the display apparatus has a panel 14 vertically supported by a base 12. The panel 14 includes the display section 16 provided with a display face 15 having a size of 10 cm×10 cm, for example. The display face 15 is constituted by a great number of fine pixels 24, each having a diameter of, e.g., 100 nm or less, arranged in a matrix, as shown in FIG. 4. The pixels 24 are of the reflection type and each display a portion of one line included in the interference pattern of a holographic diffraction figure. The pixels 24 have a resolution sufficient to display the interference pattern with the visible region. The base 12 is provided with a light source 18 of a reproduction light, which has optical elements, such as a He-Ne laser, a lens, a mirror and the like. The reproduction light radiated from the light source 18 is directed to the display face 15, while being reflected by a reflection plate 22 which also functions as a protection cover.

As shown in FIG. 1, a back plate 32 made of an insulating material, such as glass, is arranged on the back side of the display section 16. A cold cathode device 34 of the field emission type, having a great number of fine cathodes or emitter electrodes 38, is provided on the inner surface of the back plate 32. The emitter electrodes 38 consist of part of a conductive substrate 36, which is made of a refractory metal, such as Mo, fixed to the back plate 32. The emitter electrodes 38 are arranged in the second dimension to correspond to the pixels 24. The emitter electrodes 38 are respectively surrounded by gate electrodes 44 made of Al or the like, each of which is formed on the substrate 36 and the emitter electrodes 38 via an insulating layer 42 made of $SiO_2$ or the like. The gate electrodes 44 are used to draw electrons out of the emitter electrodes 38.

On the other hand, a front plate 46 made of a conductive and transparent material, such as indium tin oxide (ITO), is arranged on the front side of the display section 16. A great number of anode electrodes 48 are provided on the inner surface of the front plate 46. The anode electrodes are arranged in the second dimension to correspond to the pixels 24 and to be opposite the emitter electrodes 38, respectively. The gap among the anode electrodes 48 is filled with a light-absorbing layer 52 formed on the inner surface of the front plate 46 and made of a resin material, to prevent the reproduction light from leaking. The entirety of the inner surface of the front plate 46 including the anode electrodes 48 and the light-absorbing layer 52 is covered with an epoxy resin layer or protection insulating layer 53. The outer surface of the front plate 46 is coated with a dielectric multi-layer film 54 for suppressing reflection of the reproduction light on the surface of the front plate 46.

An air-tight space 28 is formed between the back and front plates 32 and 46 of the display section 16 by a seal 26 arranged to surround the display section 16. The space 28 is set at a pressure of about $10^{-3}$ Pa or less. The distance between the tops of emitter electrodes 38 and anode electrode 48 is set at about 5 μm.

In this embodiment, the cold cathode device 34 of the field emission type was manufactured along the process shown in FIGS. 3A to 3H, which show only one of the emitter electrodes 38, for the sake of simplification.

Tapered holes were formed in one surface of a substrate formed of, e.g., single crystalline Si. An anisotropic etching to single crystalline Si was utilized to form the holes, as described below.

At first, a thermal oxidation film of $SiO_2$ having a thickness of 0.04 μm was formed by a dry oxidation method on a p-substrate 71 of single crystalline Si having a crystal face of (100) plane. Then, a resist was applied onto the $SiO_2$ film by a spin-coat method, and was patterned in a stepper apparatus by subjecting it to exposing and developing treatments so as to form square openings each being, e.g., 0.04 μm×0.04 μm at intervals of 0.08 μm, in size. Then, the $SiO_2$ film was etched with a mixed solution of $NH_4F$ and HF, while the resist was used as a mask.

Figure 3A:
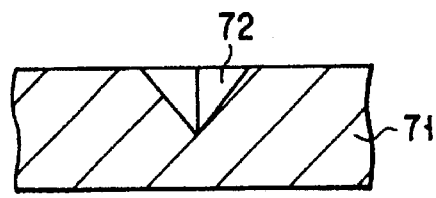
FIGS. 3A to 3H are cross-sectional views showing a method of manufacturing a cold cathode device of the field emission type which is used in the holographic display apparatus according to the embodiment.

After the resist was removed, an anisotropic etching was carried out with a solution of 30 wt % KOH, so as to form holes 72, each having a shape of a reversed pyramid and a depth of 0.24 μm, in the substrate 71 of single crystalline Si, as shown in FIG. 3A. Then, the $SiO_2$ film was removed, using a mixed solution of $NH_4F$ and HF. Since the holes 72 were formed by the etching with the KOH solution, they came to have the shape of a reversed pyramid defined by four slant side surfaces of (111) plane.

The substrate 71 of single crystalline Si having the holes formed as described above was thermally oxidized by a wet oxidization method, so as to form a thermal oxidation insulating film 73 of $SiO_2$ over the entirety of the substrate 71 including the holes 72. At this time, the insulating film 73 was controlled to have a thickness of about 0.01 μm on the (111) plane of the substrate 71, namely on the side surfaces of the holes 72. A thermal oxidation film generally has a thickness on the (100) plane of single crystalline Si, 10% greater or smaller than that on the (111) plane thereof. Therefore, the thickness of the thermal oxidation insulating film 73 on the (111) plane can be estimated based on its thickness on the (100) plane.

Figure 3E:
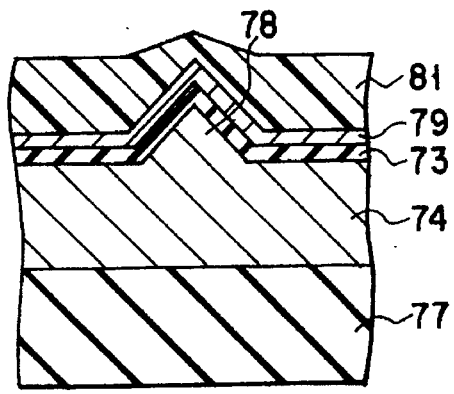
Figure 3B:
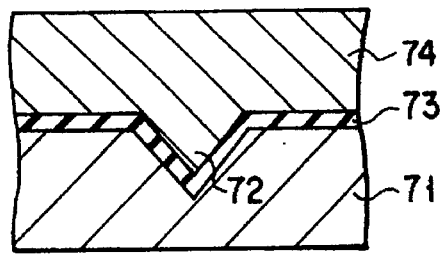

After that, as shown in FIG. 3B, a W film as an emitter material film 74 was formed on the thermal oxidation insulating film 73. Other than w, various kinds of materials such as Mo, Ta, Si and the like may be used as the emitter material. The emitter material film 74 was formed so as to sufficiently fill the holes 72 and cover the other part out of the holes 72. In this embodiment, the emitter material film was deposited up to 2 μm by a sputtering method.

On the other hand, a PYREX glass substrate 77 was prepared such that it had a thickness of 5 mm and was coated at its back side with an Al film 76 having a thickness of 0.4 μm. Then, as shown in FIG. 3C, the substrate 77 of glass and the substrate 71 of single crystalline Si were bonded via the emitter material film 74. In this process, an electrostatic bonding method may be used, which allows the cold cathode device to be light and thin.

After that, the Al film 76 at the back side of the glass substrate 77 was removed, using a mixed solution of $HNO_3$, $CH_3COOH$ and HF. The substrate 71 of single crystalline Si was also removed by etching with a mixed solution of ethylenediamine, pyrocatechol and pyrazine (ethylenediamine:pyrocatechol:pyrazine:water=75 cc:12 g:3 mg:10 cc). By doing so, as shown in FIG. 3D, the thermal oxidation film 73 of $SiO_2$ was exposed, with which projections 78, made of the emitter material and each having a shape of a pyramid, were covered.

After that, a gate electrode film, e.g., a W film 79 having a thickness of 0.15 μm was formed on the thermal oxidation film 73 of $SiO_2$ by a sputtering method. Then, a resist film 81 was formed by a spincoat method, up to a thickness of about 0.9 μm, so as to slightly cover the top of each pyramid 78, as shown in FIG. 3E.

Figure 3F:
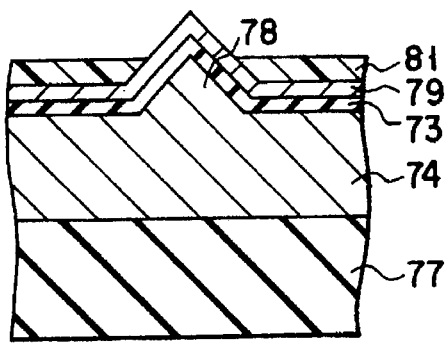
Figure 3C:
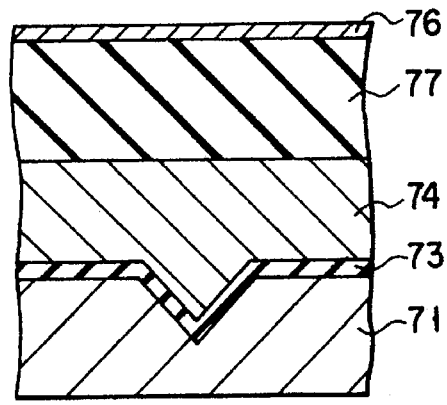
Figure 3G:
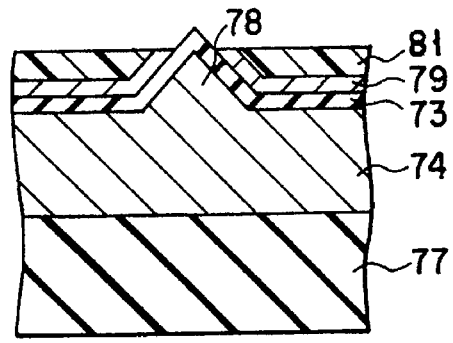
Figure 3D:
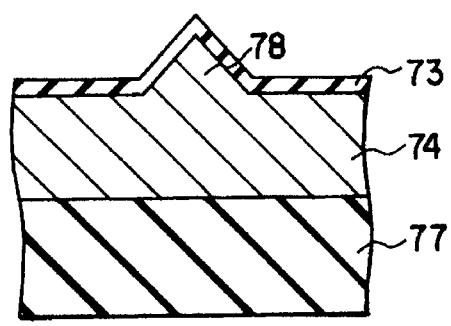

After that, as shown in FIG. 3F, a dry etching with oxygen plasma was carried out so as to etch the resist film 81 and expose the top of each pyramid of gate metal film 79 by 0.2 μm. Then, as shown in FIG. 3G, the gate metal film 79 was etched above the tops of the pyramids 78 so as to form openings by a reactive ion etching.

Figure 3H:
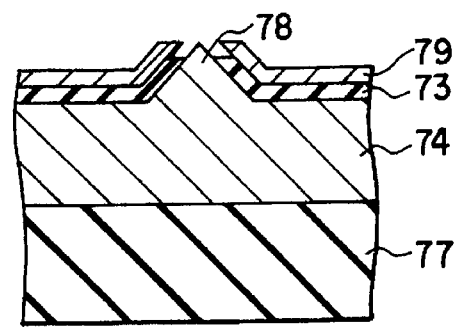

After the resist film 81 was removed, the thermal oxidation film 73 of $SiO_2$ was selectively removed, using a mixed solution of $NH_4F$ and HF. By doing so, as shown in FIG. 3H, openings were formed in the gate electrode film 79 so as to expose the top of each pyramid-like projection 78 made of the emitter material. The portions 77, 74, 78, 73 and 79 in FIG. 3H correspond to portions 32, 36, 38, 42 and 44, respectively.

Back to FIG. 1, the anode electrodes 48 are made of a material which brings about a change in its reflection coefficient, excited and induced by electrons or electron rays. In this embodiment, the anode electrodes are formed of a polymer film of polydiacetylene. This material renders a high reflection coefficient within the visible region due to a πt conjugate electron system under the electron ground state. Where the material is exited in a high density by electron rays, its light absorption is quickly saturated, such that the peak of the reflection coefficient within the visible region greatly decreases at a high response speed. It is possible, however, to use various kinds of organic or inorganic materials which are excited and induced by electron rays to change their reflection coefficient. Note that both increasing and decreasing changes in the reflection coefficient due to an electron ray radiation can be utilized in the present invention.

The anode electrodes 48 were formed on the front plate 46 along the process described below.

At first, a diacetylene film having a thickness of 300 nm was formed on the front plate 46 by a vapor deposition method. On the other hand, an emitter array plate was prepared, which had a great number of emitters arranged two dimensionally, in the same manner as that of the pixels 24. Then the front plate 46 was attached to the emitter array plate such that the diacetylene film was opposed to the emitters. At this time, the distance between the tips of the emitters and the diacetylene film was set at about 5 μm. Electron rays were uniformly radiated from respective emitters in this state, so that those parts of the diacetylene film, which were irradiated with the electron rays, were polymerized into polydiacetylene, due to a temperature rise or the like. Then, those parts of the diacetylene film which were not polymerized were selectively solved with an organic solvent, so that a matrix formed of polydiacetylene films was provided on the front plate 46. Then, the polydiacetylene films were doped with iodine and provided with a conductivity so as to form the anode electrodes 48.

An operation of the hologram display apparatus 10 will be explained below.

Voltages are applied between the emitter and gate electrodes 38 and 44, and between the emitter and anode electrode 38 and 48, such that the emitter electrode 38 is negative. The anode electrode 48 is generally provided with a positive potential higher than that of the gate electrode 44. For example, 5 V is applied between the emitter and anode electrodes 38 and 48, and electron rays are turned on and off by turning the voltage to the gate electrode 44 on and off. With the conditions set out above, electrons are drawn by gate electrodes 38 from specific emitter electrodes 38 selected by an input signal, which is prepared in accordance with the interference pattern of an holographic diffraction figure to be displayed, and radiated onto the anode electrodes 48.

When the anode electrodes 48, which are made of polydiacetylene, are irradiated with the electron rays, each of the electrodes 48 is excited and induced by the electron rays to change its reflection coefficient. For example, where the pixels 34 provided with a symbol "X" shown in FIG. 4 are selected, and the corresponding anode electrodes 48 are irradiated with electrons or electron rays from the selected emitter electrodes 38, the reflection coefficient of each of the selected pixels 24 is changed and the interference pattern of the holographic diffraction figure is obtained. Factors, such as the direction or intervals of an interference pattern, which define a holographic diffraction figure, can be changed by arbitrarily selecting some of the pixels 24. Since the front plate is made of a conductive material, electrical charges given to the anode electrodes 48 by an electron ray radiation are discharged through the front plate 46, thereby preventing the charges from being accumulated.

The reproduction light from the light source 18 is radiated onto the display face 15 in an oblique incident direction from the front and lower side relative to the display face 15. The radiated reproduction light is transmitted through the transparent front plate 46 from above in FIG. 1 and reflected by the anode electrodes 48. The dielectric multi-layer film 54 covering the front plate 46 prevents the reproduction light from being reflected on the surface of the front plate 46. Further, the light-absorbing layer 52 arranged among the anode electrodes 48 prevents the reproduction light from leaking into the inner space 28 of the display section 16. The leakage of the reproduction light effects on the contrast of the display face 15. Where a high contrast is not demanded to the display face 15, the light-absorbing layer 52 can be omitted.

There may be several methods of selectively driving the pixels 24 of the hologram display apparatus 10. FIG. 4 shows one of the methods, in which the emitter electrodes 38 respectively arranged at the pixels 24 are connected to a row driver 62 through emitter lines Ei. In order to achieve this arrangement, the substrate 36 (see FIG. 1) of the emitter electrodes 38 is electrically divided into a plurality of portions respectively corresponding to the rows. On the other hand, the gate electrodes 44 of the pixels 24 are connected to a column driver 64 through gate lines Gi. The row and column drives 62 and 64 are connected to a signal processor 66, and are provided with driving signals therefrom in accordance with an input signal representing an interference pattern to be displayed by the pixels 24.

In the driving mechanism shown in FIG. 4, the emitter lines Ei are selected by the row driver 62, and a predetermined negative potential is applied to the emitter electrodes 38 at every row. The gate lines Gi are selected by the column driver 64 at every adjacent two lines, and an on potential or off potential is applied to the gate electrodes 44 at every column. When the on potential is applied to the gate electrodes 44 in a state where the negative potential is applied to the corresponding emitter electrode 38, electrons are drawn from the emitter electrode 38 and radiated onto the corresponding anode electrode 48. In this manner, each pixel 24 located at the intersection of emitter and gate lines Ei and Gi is selectively driven.

An experiment was conducted, in which the light of a He-Ne laser or a laser beam (632.8 nm) was used as the reproduction light in the hologram display apparatus 10 shown in FIGS. 1 and 2. As a result, a holographic diffraction figure was displayed and a stereoscopic image was recognized by an observer OB. Light of any color other than light having a wavelength of 632.8 nm can be used as the reproduction light, as long as the light has a wavelength with which it can form a suitable holographic diffraction figure when radiated onto an interference pattern, and can be effected by a change in the reflection coefficient of the anode electrodes.

In this embodiment, each of the pixels in the display section is formed of a pair of emitter and anode electrodes. Each of the pixels may, however, include a plurality of emitter electrodes and/or a plurality of electrodes. In this embodiment, the air-tight space 28 is formed in the display section 16 with the seal 26 and is used as a vacuum space having a pressure of about $10^{-3}$ Pa or less. Instead, a vacuum container made of transparent glass may be prepared independently of the back and front plates 32 and 46 shown in FIG. 1, so as to house the plates 32 and 46 therein in an opposite state and to set the inside of the container at a pressure of about $10^{-3}$ Pa or less.

Another experiment was conducted, in which the display section 16 was provided with an input signal for displaying an interference pattern of so called image hologram. The image hologram employs an interference pattern obtained by interfering a reference light with an object light from an object, near the image formation plane of a lens which the object light passes through. As a result of the experiment, it has been found that a stereoscopic image can be reproduced by irradiating such an interference pattern with a room light of a fluorescent lamp or incandescent lamp, or sun light. In other words, where the interference pattern of an image hologram is used, the light source 18 can be omitted or a fluorescent lamp can be used as the light source 18 in the holographic display apparatus shown in FIG. 2.

Still another experiment was conducted, in which each of the anode electrodes 48 was formed of three stacked polydiacetylene films, which have different side chains from each other, respectively. In this experiment, at first, a matrix of a first polydiacetylene film having a thickness of 100 nm was formed on the front plate 46, in accordance with the above described method. Then, second and third polydiacetylene films each having a thickness of 100 nm were formed on the matrix in this order, in accordance with the above described method, wherein the second film had a side chain different from the first film, and the third film had a side chain different from the first and second film.

Where anode electrodes each having this multi-layer structure were employed, ratios excited among the stacked polydiacetylene films of each electrode varied and the reflection spectra of each electrode changed greatly, depending on the speed of electrons drawn from the emitter electrodes. Therefore, reproduction images obtained in this experiment changed their colors, by adjusting the speed of electrons and using light including two wavelengths or more as the reproduction light. The speed of electrons was adjusted by changing the voltage between emitter and anode electrodes or between emitter and gate electrodes.

FIG. 5 shows the arrangement of pixels 90a, 90b and 90c in the display section 16 of a holographic display apparatus according to another embodiment of the present invention. In this embodiment, the views of the entire holographic display apparatus and of the cross section of the display section 16 are basically the same as those shown in FIGS. 2 and 1, respectively. This embodiment differs from the former embodiment in that the pixels 90a, 90b and 90c are prepared to display three colors, red R, green G and blue B, respectively. A plurality of pixel sets 92, each consisting of three adjacent colors, are arranged in a matrix two dimensionally. A reproduction light source 18 can emit three laser beams having different wavelengths corresponding to three colors R, G, and B. In this case, the light source 18 is preferably constructed such that the wavelengths of the laser beams can be adjusted.

As in the former embodiment, each of anode electrodes 48 forming the pixels 90a, 90b and 90c is made of a polymer film of polydiacetylene, which is excited and induced by electron rays to change its reflection coefficient. The polymer films of the three colors R, G and B, however, are prepared to have changes in their reflection coefficient, respectively, when irradiated with electron rays, near the wavelengths of the reproduction light, corresponding to colors R, G and B. This preparation is achieved by altering a substituent in the side chain of polydiacetylene so as to change its structure in the third dimension.

An experiment was conducted, in which an interference pattern was displayed on the display face 15 of this embodiment on the basis of an input signal for displaying a colored figure, and a coherent light source formed of color element lasers corresponding to the three colors R, G and B was used as the reproduction light source 18. As a result, a colored stereoscopic image was recognized by an observer OB.

Another experiment was conducted, in which the display section 16 of this embodiment was provided with an input signal for displaying an interference pattern of image hologram. The image hologram employs an interference pattern obtained by interfering a reference light with an object light from an object, near the image formation plane of a lens which the object light passes through. As a result of the experiment, it has been found that image-overlapping of the three colors R, G and B for forming a stereoscopic image can be easily treated.

According to the present invention, since the pixels of a display section are formed, using fine cold cathode electrodes of the field emission type, it is possible to realize a hologram display apparatus, which has a resolution sufficient to display an interference pattern necessary for hologram within the visible region, and can refigure images or display moving images. Conventionally, such a hologram display apparatus cannot be realized. In particular, the pixels using fine cold cathode electrodes of the field emission type can have a high response speed respectively, and it is possible to realize a hologram display apparatus suitable for displaying moving images, in which different interference patterns are sequentially displayed at a high rate.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A holographic display apparatus for displaying an interference pattern of a holographic diffraction figure which is irradiated with a reproduction light to reproduce a stereoscopic image, comprising:

a plurality of anode electrodes arranged such that each of a plurality of pixels arranged in a matrix is defined by at least one of the anode electrodes, said anode electrodes being excited and induced to change their reflection coefficient when irradiated with electrons;

a plurality of emitter electrodes arranged opposite said anode electrodes, said emitter electrodes selectively emitting electrons to said anode electrodes by field emission;

a casing for defining an air-tight vacuum space containing said anode and emitter electrodes; and a drive mechanism for selecting some of said emitter electrodes and causing them to emit electrons, in accordance with an input signal representing an interference pattern to be displayed by said pixels;

wherein an interference pattern is displayed on the basis of a change in the reflection coefficient of said anode electrodes due to radiation of electrons emitted from said emitter electrodes.

2. The apparatus according to claim 1, further comprising a plurality of gate electrodes corresponding to said emitter electrodes, wherein electrons are drawn from said emitter electrodes by a potential difference between said emitter and gate electrodes.

3. The apparatus according to claim 2, wherein said emitter and gate electrodes are part of a cold cathode device which emits electrons by field emission, and are stacked via an insulating film.

4. The apparatus according to claim 3, wherein each of said anode electrodes has front and back faces, said front face being used to display an interference pattern, said back face facing said emitter electrodes.

5. The apparatus according to claim 1, further comprising a protection insulating film covering said back face of each of said anode electrodes.

6. The apparatus according to claim 1, further comprising a light-absorbing layer filling a gap among said anode electrodes.

7. The apparatus according to claim 1, further comprising a light source, which emits said reproduction light.

8. The apparatus according to claim 7, wherein said light source comprises a source of a laser beam.

9. The apparatus according to claim 1, wherein said input signal is a signal for displaying an interference pattern of image hologram, which is obtained by interfering a reference light with an object light from an object, near an image formation plane of a lens which said object light passes through.

10. The apparatus according to claim 1, wherein each of said anode electrodes is formed of a polydiacetylene film.

11. A holographic display apparatus for displaying an interference patter of a holographic diffraction figure which is irradiated with a reproduction light to reproduce a colored stereoscopic image, comprising:

a plurality of anode electrodes arranged such that each of a plurality of pixels arranged in a matrix is defined by at least one of the anode electrodes, said anode electrodes being excited and induced to change their reflection coefficient when irradiated with electrons, said pixels forming a plurality of pixel sets comprising three adjacent pixels for displaying red, green and blue, said anode electrodes, used for displaying red, green and blue, being prepared to have changes in their reflection coefficient, respectively, when irradiated with electrons, near wavelengths of the reproduction light, corresponding to red, green and blue;

a plurality of emitter electrodes arranged opposite said anode electrodes, said emitter electrodes selectively emitting electrons to said anode electrodes by field emission;

a casing for defining an air-tight vacuum space containing said anode and emitter electrodes; and a drive mechanism for selecting some of said emitter electrodes and causing them to emit electrons, in accordance with an input signal representing an interference pattern to be displayed by said pixels;

wherein an interference pattern is displayed on the basis of a change in the reflection coefficient of said anode electrodes due to radiation of electrons emitted from said emitter electrodes.

12. The apparatus according to claim 11, further comprising a plurality of gate electrodes corresponding to said emitter electrodes, wherein electrons are drawn from said emitter electrodes by a potential difference between said emitter and gate electrodes.

13. The apparatus according to claim 12, wherein said emitter and gate electrodes are part of a cold cathode device which emits electrons by field emission, and are stacked via an insulating film.

14. The apparatus according to claim 13, wherein each of said anode electrodes has front and back faces, said front face being used to display an interference pattern, said back face facing said emitter electrodes.

15. The apparatus according to claim 11, further comprising a protection insulating film covering said back face of each of said anode electrodes.

16. The apparatus according to claim 11, further comprising a light-absorbing layer filling a gap among said anode electrodes.

17. The apparatus according to claim 11, further comprising a light source, which emits said reproduction light.

18. The apparatus according to claim 17, wherein said light source comprises a source of laser beams having three different wavelengths corresponding to red, green and blue.

19. The apparatus according to claim 11, wherein said input signal is a signal for displaying an interference pattern of image hologram, which is obtained by interfering a reference light with an object light from an object, near an image formation plane of a lens which said object light passes through.

20. The apparatus according to claim 11, wherein each of said anode electrodes is formed of a polydiacetylene film.

* * * * *